United States Patent
Fripp et al.

(10) Patent No.: US 11,486,246 B2
(45) Date of Patent: Nov. 1, 2022

(54) ACOUSTICS THROUGH FLUID COMMUNICATION SYSTEM

(71) Applicant: Halliburton Energy Services, Inc., Houston, TX (US)

(72) Inventors: Michael Linley Fripp, Carrollton, TX (US); Thomas Jules Frosell, Irving, TX (US); Richard Decena Ornelaz, Frisco, TX (US); Donald Kyle, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/314,308

(22) PCT Filed: Nov. 29, 2017

(86) PCT No.: PCT/US2017/063786
§ 371 (c)(1),
(2) Date: Dec. 28, 2018

(87) PCT Pub. No.: WO2019/108184
PCT Pub. Date: Jun. 6, 2019

(65) Prior Publication Data
US 2021/0222550 A1    Jul. 22, 2021

(51) Int. Cl.
*E21B 47/14*    (2006.01)
*E21B 47/18*    (2012.01)
*H04B 11/00*    (2006.01)

(52) U.S. Cl.
CPC .................................. *E21B 47/18* (2013.01)

(58) Field of Classification Search
None
See application file for complete search history.

(56) References Cited

U.S. PATENT DOCUMENTS

2009/0159272 A1*  6/2009  Auzerais .............. E21B 47/107
                                                     166/250.01
2010/0194584 A1   8/2010  Savage
                          (Continued)

FOREIGN PATENT DOCUMENTS

WO   WO-2012010898 A2 *  1/2012  ........... E21B 47/001
WO   WO-2013185064 A1 * 12/2013  ............. G10K 11/18
WO      2016133565 A1    8/2016

*Primary Examiner* — Curtis A Kuntz
*Assistant Examiner* — Jerold B Murphy
(74) *Attorney, Agent, or Firm* — Scott Richardson; Parker Justiss, P.C.

(57) ABSTRACT

The disclosure is directed to a well system environment communication system comprising of an acoustic communicator capable of communicating encoded data with a first wireless transceiver through a fluid medium and the first wireless transceiver capable of communicating encoded data with a second transceiver through a non-fluid medium. In one example, an acoustic communicator is communicatively coupled with a downhole tool allowing the downhole tool to communicate indirectly with a well system controller. In another aspect of the disclosure, a method is described wherein an acoustic communicator located in a wellbore can encode data from a downhole tool and communicate the data through a fluid medium to a first wireless transceiver and the first wireless transceiver can communicate with a second transceiver through a non-fluid medium.

20 Claims, 9 Drawing Sheets

(56) References Cited

U.S. PATENT DOCUMENTS

| | | | |
|---|---|---|---|
| 2011/0075520 A1* | 3/2011 | Gulgne | G01V 1/159 367/157 |
| 2012/0146805 A1* | 6/2012 | Vick, Jr. | E21B 34/14 340/853.2 |
| 2013/0308424 A1* | 11/2013 | Kumar | E21B 47/107 367/82 |
| 2014/0110178 A1* | 4/2014 | Savage | E21B 7/062 175/76 |
| 2014/0153368 A1* | 6/2014 | Bar-Cohen | G10K 11/34 367/81 |
| 2014/0198617 A1 | 7/2014 | Noui-Mehidi et al. | |
| 2014/0233353 A1* | 8/2014 | Bravard | E21B 47/16 367/82 |
| 2015/0292320 A1 | 10/2015 | Lynk et al. | |
| 2017/0126271 A1* | 5/2017 | Maclean | H04B 11/00 |
| 2018/0058202 A1* | 3/2018 | Disko | E21B 47/017 |
| 2018/0058209 A1* | 3/2018 | Song | E21B 47/017 |
| 2019/0112919 A1* | 4/2019 | Song | G01V 11/002 |
| 2020/0116017 A1* | 4/2020 | Deville | E21B 34/16 |

\* cited by examiner

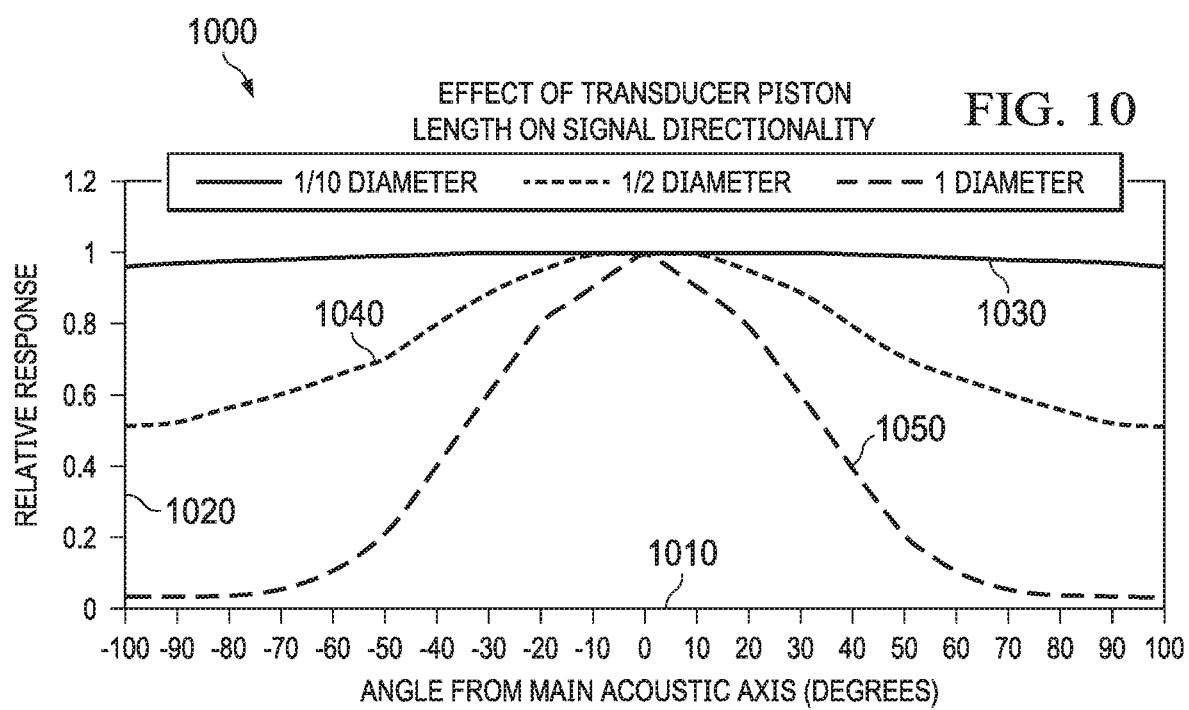

ACOUSTICS THROUGH FLUID COMMUNICATION SYSTEM

CROSS-REFERENCE TO RELATED APPLICATION

This application is the National Stage of, and therefore claims the benefit of, International Application No. PCT/US2017/063786 filed on Nov. 29, 2017, entitled "AN ACOUSTIC THROUGH FLUID COMMUNICATION SYSTEM." The above application is commonly assigned with this National Stage application and is incorporated herein by reference in its entirety.

BACKGROUND

Hydrocarbons, such as oil and gas, are located in subterranean formations. To obtain the oil or gas, various oil and gas operations, such as drilling, logging, and completion, are performed. Communication up and down the wellbore between the various equipment and controllers at the surface of the wellbore and the tools, components, and sensors located within the wellbore are beneficial for the performance of the various oil and gas operations. Reliable communications uphole and downhole in the harsh environment of a wellbore is challenging in the various operations.

BRIEF DESCRIPTION

Reference is now made to the following descriptions taken in conjunction with the accompanying drawings, in which:

FIG. 1 illustrates a diagram of an example of a well system environment including a communication system and an apparatus as described in FIGS. 6, 7, and 8;

FIG. 2, expanding further on FIG. 1, illustrates a diagram of an example of a well system environment with multiple communicators and transceivers located throughout the well system environment;

Figure 7:
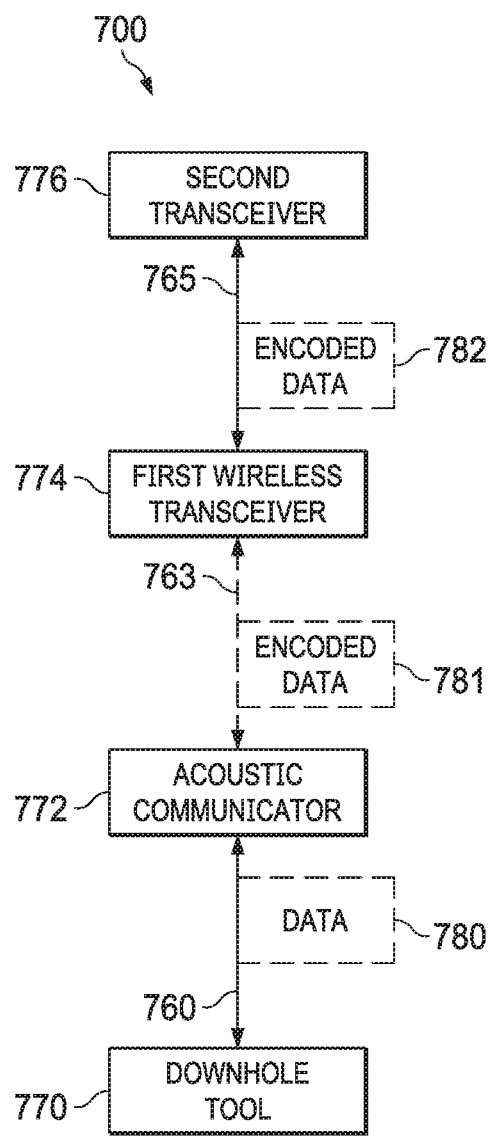
FIG. 7 illustrates a block diagram of an example of a well system communication system with an acoustic through fluid component.
Figure 8:
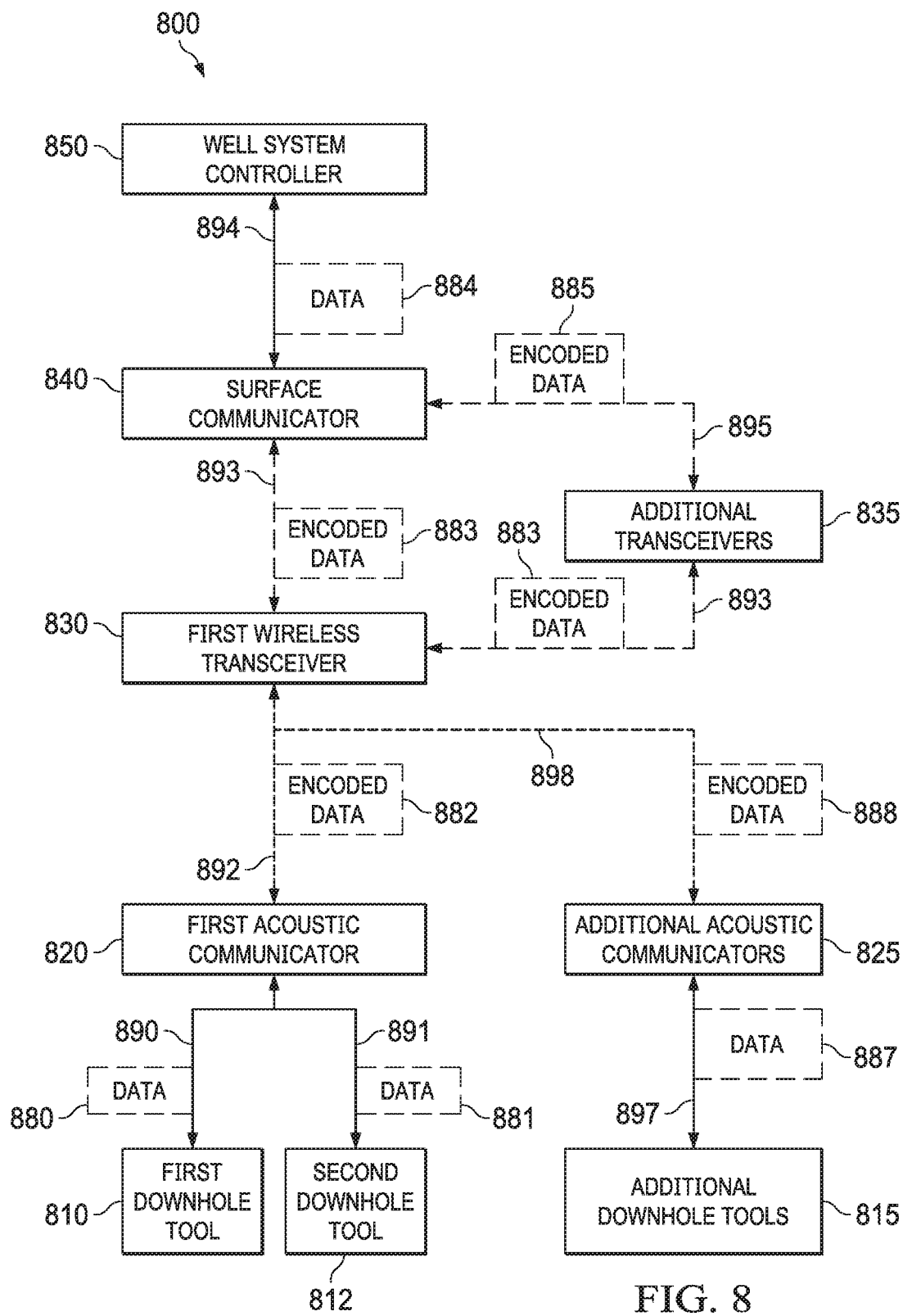
Figure 9:
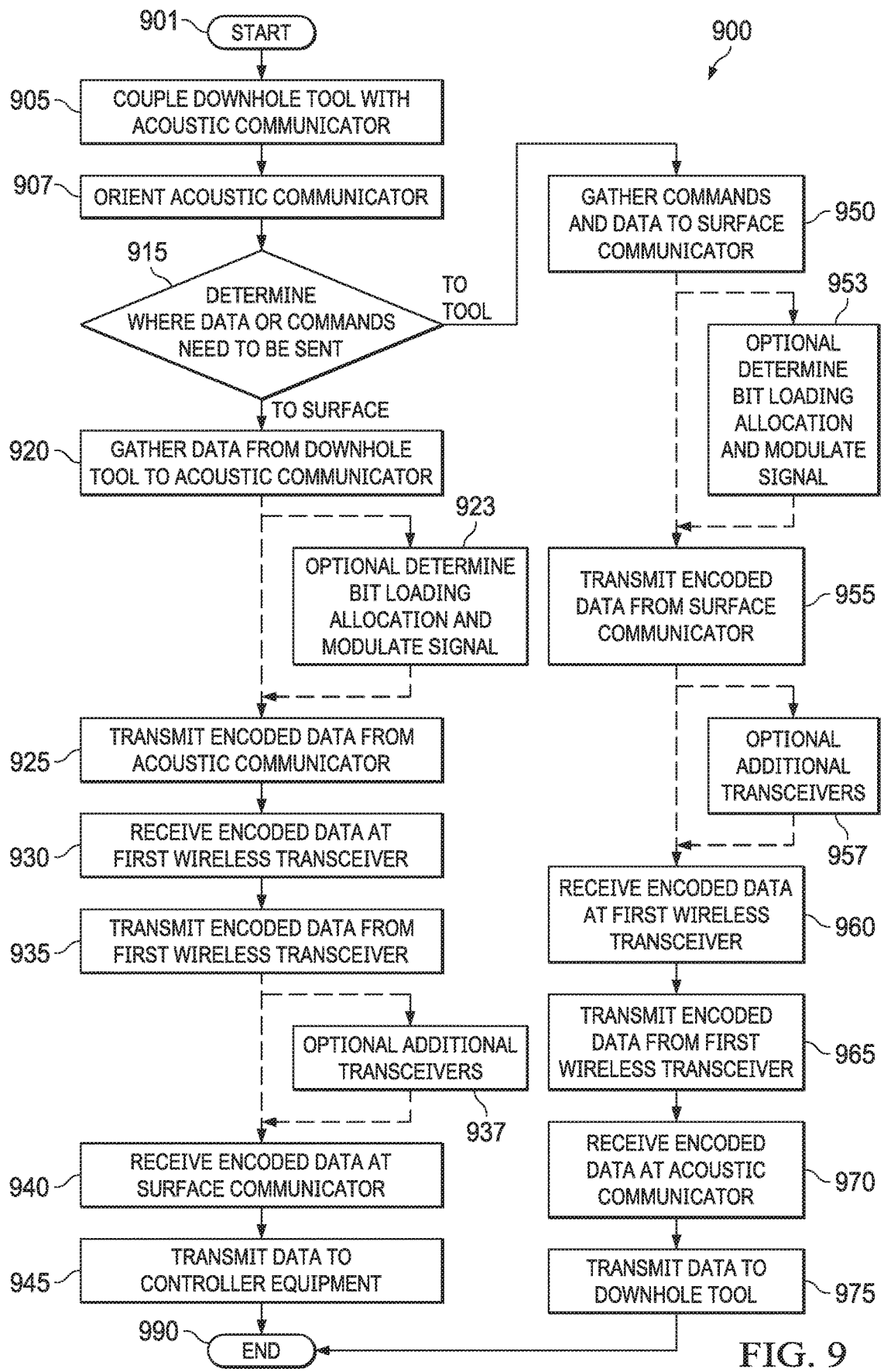

FIG. 8, expanding further on FIG. 7, illustrates a block diagram of an example of a well system communication system with a communication link between a downhole tool and a well system controller;

FIG. 9 illustrates a flow diagram of an example of a method for a communication link between a downhole tool and a well system controller; and FIG. 10 illustrates a chart of an example graph demonstrating the effect of a transducer piston length on signal directionality.

DETAILED DESCRIPTION

In a well system environment, there are various methods for transmitting and receiving information between a well system controller located proximate to a surface of a wellbore and a downhole tool located within the wellbore that are presently employed in the oil and gas industry. For example, acoustic transmission of information through a solid material, such as tubing inserted in the wellbore, can be used to send commands or information to activate downhole tools or components.

Though vibration of tubing can be used in the harsh environment of the wellbore, this type of a communication system requires continuous tubing. Gaps or breaks in tubing can prevent the communication from reaching its intended destination. Some locations within a wellbore lack continuous tubing by necessity, for example, at multi-lateral junctions, between upper and lower completions, across liners in an open hole completion, and between strings of tubing. Additionally, vibration of tubing can attenuate at difficult places, for example, at fluted hangers, travel joints, and well heads. Therefore, another type of reliable communication system can be beneficial.

Accordingly, disclosed herein is a communication system for a well system environment that transmits a signal including encoded data through different types of transmission mediums. The disclosed communication system can provide two way communication of digitally encoded information in a well system environment employing different transmission mediums over different portions of a wellbore. Thus, a first wireless transceiver can be configured to utilize a fluid telemetry medium when communicatively coupled to an acoustic communicator, and the first wireless transceiver can be configured to utilize a tubing telemetry medium when communicatively coupled to a second transceiver. The communicatively coupled communication devices, linked via signals sent through the various transmission mediums, provide a continuous communication link in a well system environment. The various mediums used for transmission of signals can be electrically, physically, or acoustically coupled, as appropriate for the devices utilized in various sections of the communication system, to provide a reliable two-way communication link for encoded data.

Acoustic signals through a fluid medium can be generated and received by one or more various types of devices. For example, various types of transducers can be used, such as a piston transducer, ring transducer, flextensional transducer, diaphragm transducer, hydrophone, accelerometer, strain sensor, and pressure transducer. Piston transducers include Tonpilz, Langevin, and Sandwich designs. The transducer for transmitting the acoustic signal does not need to be the same as the transducer for receiving the acoustic signal. The type of transducer, the size of the piston head, and the orientation of the transducer can affect the signal reliability and distance the signal can travel before attenuating. The acoustic communicator and first wireless transceiver portions of the communication system can be oriented in such a way as to provide that the internal piston head portion of the transducer, which is a component of the acoustic communicator and first wireless transceiver, is in the direction of the respective intended receiver so as to maximize the transmission signal strength. Acoustic transmission directionality can be estimated by evaluating a ratio of the diameter of the transducer piston head to a wavelength of the acoustic transmission signal in the fluid within the wellbore. A ratio of one-half (½), meaning the piston head diameter is half of the wavelength of an acoustic transmission signal in a fluid, would result in better transmission directionality and therefore a stronger transmission signal that can propagate a longer distance prior to needing a repeater, than compared to a ratio of one-tenth (1/10), meaning the piston head diameter is one-tenth (1/10) the wavelength of an acoustic transmission signal through the fluid.

Due to signal attenuation, which varies on the condition within the wellbore and the distance the transmission signal needs to travel, additional transceivers, effectively acting as repeaters, can be utilized by the disclosed communication system within the wellbore until the transmission signal reaches a surface communicator that is communicatively coupled with a well system controller.

For example, a downhole tool can be communicatively coupled to an acoustic communicator, i.e. a communication device, which can send encoded information, as a transmission signal, through a fluid medium (an acoustic transmission) to a first wireless transceiver. The first wireless transceiver can send the encoded information, again as a transmission signal, along a second non-fluid medium, such as a tubing (using an acoustic transmission) or an electronic wire or cable (electronic transmission) to a second transceiver. A fiber optics device, such as a distributed acoustic sensing fiber optic sensor (DAS), can also be used to receive an acoustically communicated transmission signal and, in turn, transmit the same using a fiber optic medium through an additional portion of the wellbore.

Additional combinations of transceivers are possible within the disclosed communication system, for example, a downhole tool can be communicatively coupled to a first acoustic communicator which can communicate an acoustic transmission signal through a fluid medium with a second acoustic communicator. The second acoustic communicator can, in turn, communicate an acoustic transmission signal through a second fluid medium, such as a different fluid column, to a first wireless transceiver. The first wireless transceiver can communicate with another transceiver through a non-fluid medium, such as a tubing, wire, cable, or fiber optic line.

Multiple downhole tools can be communicatively coupled with their own respective acoustic communicator. Multiple downhole tools can also be communicatively coupled with one or more acoustic communicators. The acoustic communicator can communicate an acoustic transmission signal through a fluid medium to a first wireless transceiver. This type of communication scheme can allow multiple downhole points within a wellbore to be communicatively joined to one or more transceivers including a surface communicator. The encoded data within the transmission can include appropriate identification information, to identify the specific tool, so a downhole tool can communicate independently with the well system controller despite the potential for multiple transmissions occurring at the same or overlapping time periods.

Each acoustic communicator, surface communicator, first wireless transceiver, second transceiver, and additional transceivers (collectively, "Transceivers") are capable of communicating with the other through receiving and transmitting a transmission signal. The transmission signal includes encoded data which can be, for example, gathered data, commands, parameters, confirmations, or tool identifications. The Transceivers are capable of utilizing a variety of encoding schemes and signal modulations of a carrier frequency. The transmission carrier signal can be modulated utilizing one or more of frequency shift keying, phase shift keying, frequency hopped spectrum, direct sequence spread spectrum, frequency and pulse-position, multiple frequency shift keying, amplitude modulation, and orthogonal frequency-division multiplexing.

In addition, the transceivers can utilize different bit loading schemes when generating the transmission signal. Bit loading is a technique of creating data packets that take into account various transmission factors, for example, signal-to-noise and signal-to-noise-plus-interference, to create a digital packet minimizing the number of bit errors in the digital signal received by a receiver device. The bit loading and modulation of the carrier signal can be selected utilizing the conditions within the wellbore and transmission factors, such as signal-to-noise and signal-to-noise-plus interference, that may be present in the well system environment.

A well system downhole tool, that can be inserted at a depth within a wellbore, and communicatively coupled to an acoustic communicator for transmitting encoded data through acoustic transmission signals in a wellbore fluid medium is disclosed herein. The downhole tool can be, for example, a Remote Open Close Tool (ROCT), a sensor (such as a temperature, pressure, flow rate, flow composition, vibration, and other sensor types), a sliding sleeve, a valve, an actuator, or other tools where the movement of the tool results in a change of a fluid flow within the wellbore.

An acoustic communicator can be attached to a downhole tool, attached to a zonal isolation device, or located elsewhere within the fluid where a reliable communication link can be maintained with the downhole tool. For example, the acoustic communicator can be incorporated into a frac ball, a frac plug, a sliding sleeve assembly, or on a jointed tubing. The acoustic communicator, once communicatively coupled with the downhole tool, can provide wireless, two-way communication through the wellbore fluid medium with a first wireless transceiver located a distance from the downhole tool and acoustic communicator.

The downhole tool can collect and generate data values, utilizing physical measurements or differential variations in values, and transmit the collected data through the communication system to a well system controller. The downhole tool can record the collected data and transmit the data during the interval between that downhole wellbore zone's stimulation operation and another wellbore zone's stimulation operation.

Information and commands, i.e. data, can be sent from either a well system controller or a downhole tool to the other respective device via the same or a different transmission path, effectively creating a two-way communication link between the downhole tool and the well system controller. The data can be, for example, command instructions, confirmation on a received command, confirmation on an executed command, status update from the downhole tool, location of the downhole tool, force utilized by the downhole tool, position of a sleeve, position of a valve, the downhole tool power available, battery condition, temperature, fluid flow rate, fluid flow composition, vibration, absolute pressure measurement, relative pressure measurement, measurement while drilling data, and logging while drilling data.

The disclosed communication system can be employed in various wellbore applications. A communication link between a downhole tool located in a wellbore and a transceiver located uphole in the wellbore can be utilized to relay encoded data transmissions from sensors and tools that are located deeper in the wellbore providing real-time or near real-time information from the downhole tool to a system operator located at the surface.

For example, the communication system can be utilized to provide measurement while drilling (MWD) and logging while drilling (LWD) data while a well system operation is active or inactive, such as when a set of mud pumps are not flowing. The communication system can communicate a transmission signal during the survey section of a logging process. Advantageously, the disclosed communication system may deliver higher bit rates than traditional mud pulse telemetry and deliver more total bits of data per time period. The communication system can also be utilized in wireline and completed well operations where the downhole tool and acoustic transceiver can be physically coupled via conventional connections to the surface equipment for operations.

The disclosed communication system can be employed during a movement of a downhole tool within a wellbore. The communication system can provide real-time or near real-time feedback of actions of the downhole tool that can be used to validate the positioning and orientation of the tool, the location of the tool within the wellbore, the receipt of commands from the surface, the health of the tools, the position of sleeves and valves, battery life, etc. The disclosed communication system can be active during the downhole tool movement and does not need to be optimized for a transmission modulation or frequency during this operational phase.

The disclosed communication system is also an effective communication scheme during a stimulation well system operation, such as hydraulic fracturing. In many stimulation well system operations, the operation is performed in a cemented wellbore casing. Acoustic through tubing medium, alone, is not necessarily effective in a cemented wellbore casing environment due to the attenuation of the acoustic waves by the cement. An acoustic transmission through a fluid medium is not affected by the cement and thus allows for more reliable transmission signal.

The disclosed communication system can also be utilized with slickline tools as well as with pump-down tools. Slickline refers to a non-electrical wire which is used to run tools into a wellbore for a variety of wellbore operations. The communication system can transmit information about the slickline and pump-down tool location as well as information about the condition of the wellbore, the position of sleeves and valves, and the status of the tool. This established two-way communication of encoded data can allow slickline operations to execute like a wired operation would execute, i.e. with real-time or near real-time sensor measurements provided to the system operator. Slickline operations, utilizing the disclosed communication system, can include operations typically performed on an electric line, such as basic completion intervention operations, advanced services, recording accurate flow profiles or reservoir boundaries, perforating, setting packers, and other mechanical intervention operations. For example, two-way communication established using the disclosed communication system can be used to tell downhole power equipment (DPE) to stroke, to verify the command was received, to record the forces applied by the DPE, and to indicate the time when the operation completed.

Figure 1:
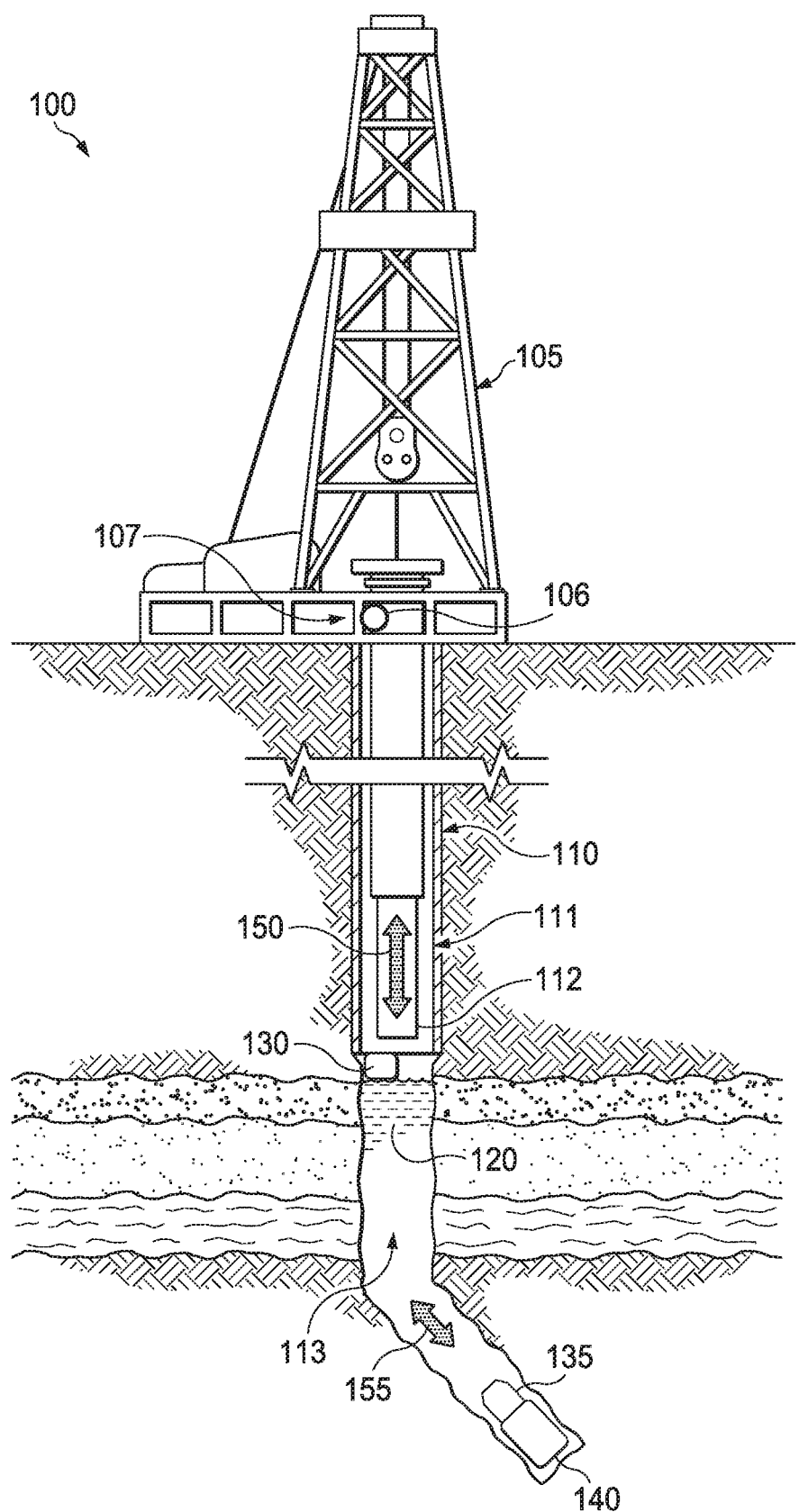

Turning to the figures, FIG. 1 illustrates a diagram of an example well system 100 that includes an acoustics communication system. Well system operators have a need to gather information from locations within a wellbore of the well system 100 and to send commands to tools located within the wellbore. This example includes well system surface equipment 105, a well system controller 107, a surface communicator 106 (the surface communicator 106 can also be considered or called a second transceiver), and a wellbore 110 extending into the ground from the surface equipment 105. Within the wellbore 110 is a cased section 111 that includes tubing 112, an uncased section 113, a first wireless transceiver 130, an acoustic communicator 135, and a downhole tool 140. There can be one or more cased sections 111. The wellbore 110 is filled with a fluid 120 to at least a depth up to the first wireless transceiver 130. There can be multiple acoustic communicators 135 and multiple downhole tools 140 in the wellbore 110.

Communication in the well system 100 can be initiated at either end of a communication link that includes the surface communicator 106, the first wireless transceiver 130, and the acoustic communicator 135. For this example, the communication transmission is initiated by the downhole tool 140. Downhole tool 140 is communicatively coupled with the acoustic communicator 135. Downhole tool 140 and acoustic communicator 135 can be attached to each other, acoustic communicator 135 can be incorporated into downhole tool 140, or they can be separate devices that are communicatively coupled. Downhole tool 140 can generate or collect a set of data, observations, measurements, or other information which is then transmitted to the acoustic communicator 135.

Acoustic communicator 135 includes at least a transducer and a processor capable of at least encoding/decoding, modulating/demodulating, and transmitting/receiving an acoustic transmission signal via a fluid transmission medium. Other components can be included as well in acoustic communicator 135. Acoustic communicator 135 is oriented in such a way that the transducer head is pointed generally toward the intended transmission recipient. This orientation will help increase the directionality of the transmission signal 155, allowing the transmission signal 155 to travel a longer distance prior to it attenuating and losing signal integrity. The actual distance the transmission signal 155 can travel is dependent on the wellbore conditions and geometry, such as the type of fluid 120, the temperature of the fluid 120, the pressure of the fluid 120, and other factors. This orientation of acoustic communicator 135 can help reduce the number of repeaters within the wellbore.

Acoustic communicator 135, after receiving the downhole tool 140 information, will determine an encoding scheme, a bit loading scheme, and a signal modulation scheme, of a variety of available types. Transmission signal 155, including the encoded data, can be sent from acoustic communicator 135 through the fluid 120. The transmission signal 155 can be received by a first wireless transceiver 130, which is located uphole from the acoustic communicator 135. The first wireless transceiver 130 includes similar features of the acoustic communicator 135, and also includes an additional communication capability, such as an acoustic through tubing type of communication method.

First wireless transceiver 130, via its processor, can decode and encode the data, modulate, or otherwise manipulate the encoded data and transmission signal, prior to transmitting the encoded data, using transmission signal 150, through the first wireless medium. In this example, the first wireless medium is tubing 112 which is capable of carrying an acoustic transmission signal from the first wireless transceiver 130 to a surface communicator 106.

Surface communicator 106 can be located within the wellbore, located proximate to the well system surface equipment 105, or located proximate to the well system controller 107. The surface communicator 106, after receiving transmission signal 150 via tubing 112, can transmit the transmission signal to a well system controller 107 for further processing. As with the first wireless transceiver 130, and acoustic communicator 135, the surface communicator 106 is configured with sufficient circuitry and processor capability to transmit and receive a transmission signal, encode and decode the data, and modulate the transmission signal as needed.

The transmission of the data, instructions, commands, or other information can be conducted in either direction within this communication system. Well system controller 107 can send a command to downhole tool 140 via surface communicator 106, to a first wireless transceiver 130, to an acoustic communicator 135, and finally to a downhole tool 140.

Figure 2:
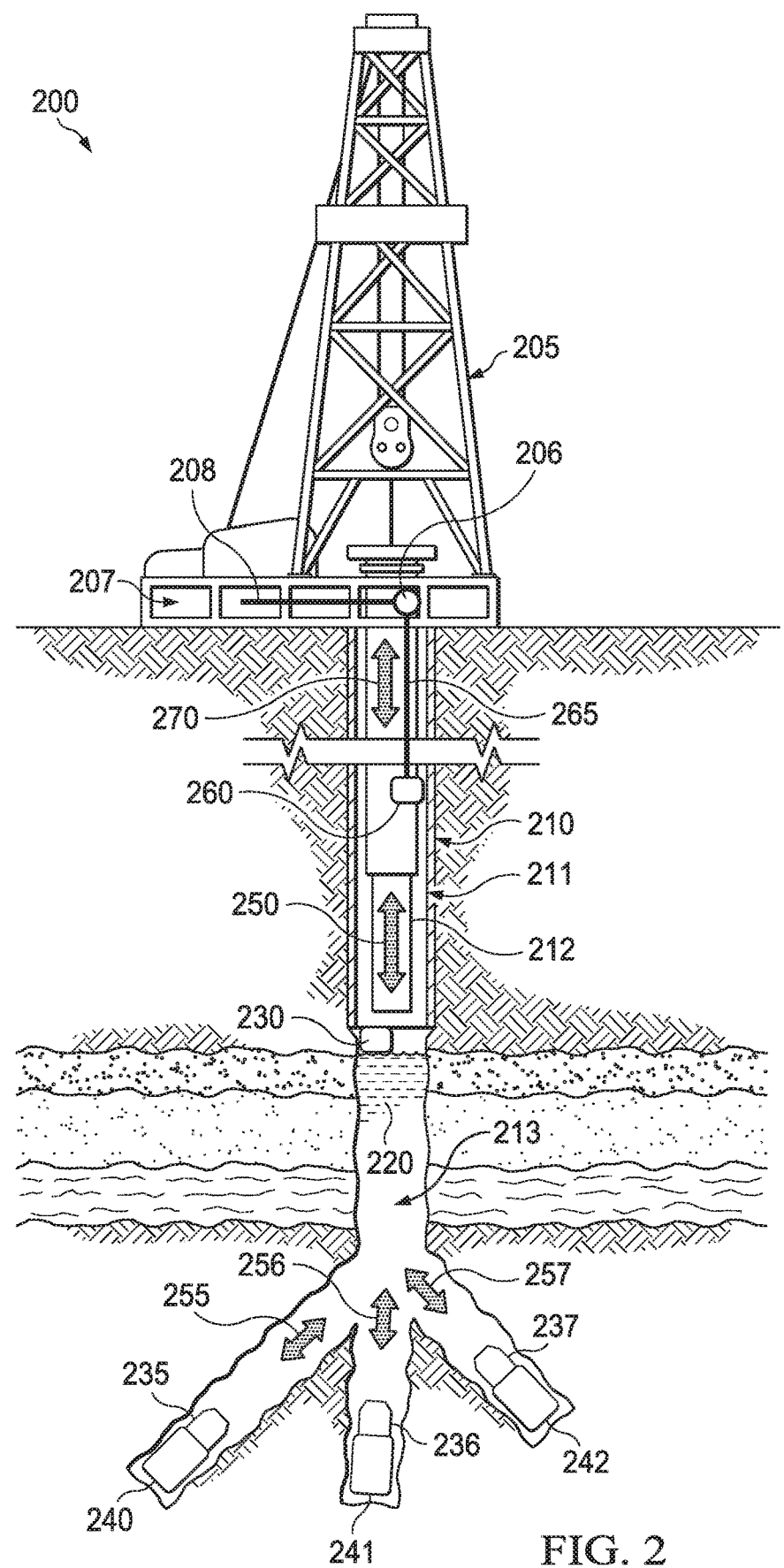

FIG. 2, building on the example well system 100, illustrates a diagram of an example well system 200 having a communication system with multiple acoustic transceivers. Due to complicated well system geometry, multiple downhole locations of the well system 200 can have a separate communication link. In this example, there are three separate downhole locations and an additional transceiver located within the wellbore 210.

Well system 200 includes well system surface equipment 205, a well system controller 207, a surface communicator 206 located proximate the well system surface equipment 205 and communicatively coupled with the well system controller 207 via a wired or wireless transmission medium 208, a wellbore 210 located below the well system surface equipment 205, a cased wellbore section 211 (additional cased sections can be present), an uncased section 213, a second transceiver 260 located in wellbore 210 and communicatively coupled with surface communicator 206 via a fiber optic cable 265 (though various types of communication lines can be utilized), a first wireless transceiver 230 located further downhole than the second transceiver 260 and communicatively coupled with the second transceiver 260 via a tubing 212 (though the communication coupling can be by various types, such as cable, fiber, or other types), and multiple acoustic communicators 235, 236, 237, communicatively coupled to their respective proximate downhole tools 240, 241, 242. The wellbore 210 is filled with a fluid medium 220 to a certain depth, at least to the first wireless transceiver 230.

Communication in the well system 200 can occur in a bi-directional manner, from one of the downhole tools 240, 241, 242, to the well system controller 207 and in the reverse direction. In this example, the acoustic communicators 235, 236, 237, include the additional capability to include downhole tool identification information with the encoded data so when transmission signals 255, 256, 257, are transmitted, the origination or destination of the transmission signal can be identified by the other components of the communication system of the well system 200. For example, the downhole tool identification can be utilized by the well system controller 207 so that when a command is sent from the well system controller 207, the appropriate downhole tool that corresponds to the identification information will react or respond to the information or command.

First wireless transceiver 230 has the capability to send and receive multiple acoustic transmission signals, such as transmission signals 255, 256, 257, through the fluid medium 220. The first wireless transceiver 230, in some examples, can have a fixed orientation, and in other examples, can alter its orientation for the transmission signal sent to increase the directionality of the transmitted signal.

Another aspect that is differentiated from well system 100 is that first wireless transceiver 230 can communicate with a second transceiver 260 via a transmission signal 250. The second transceiver 260 can be located within the wellbore 210 at a further uphole position than the first wireless transceiver 230. Second transceiver 260, after communicating with first wireless transceiver 230, can communicate with another transceiver or the surface communicator 206. This portion of the communication system can be wired or wireless. In this example, second transceiver 260 is communicating transmission signal 270 via a fiber optic cable 265 with surface communicator 206.

Figure 3:
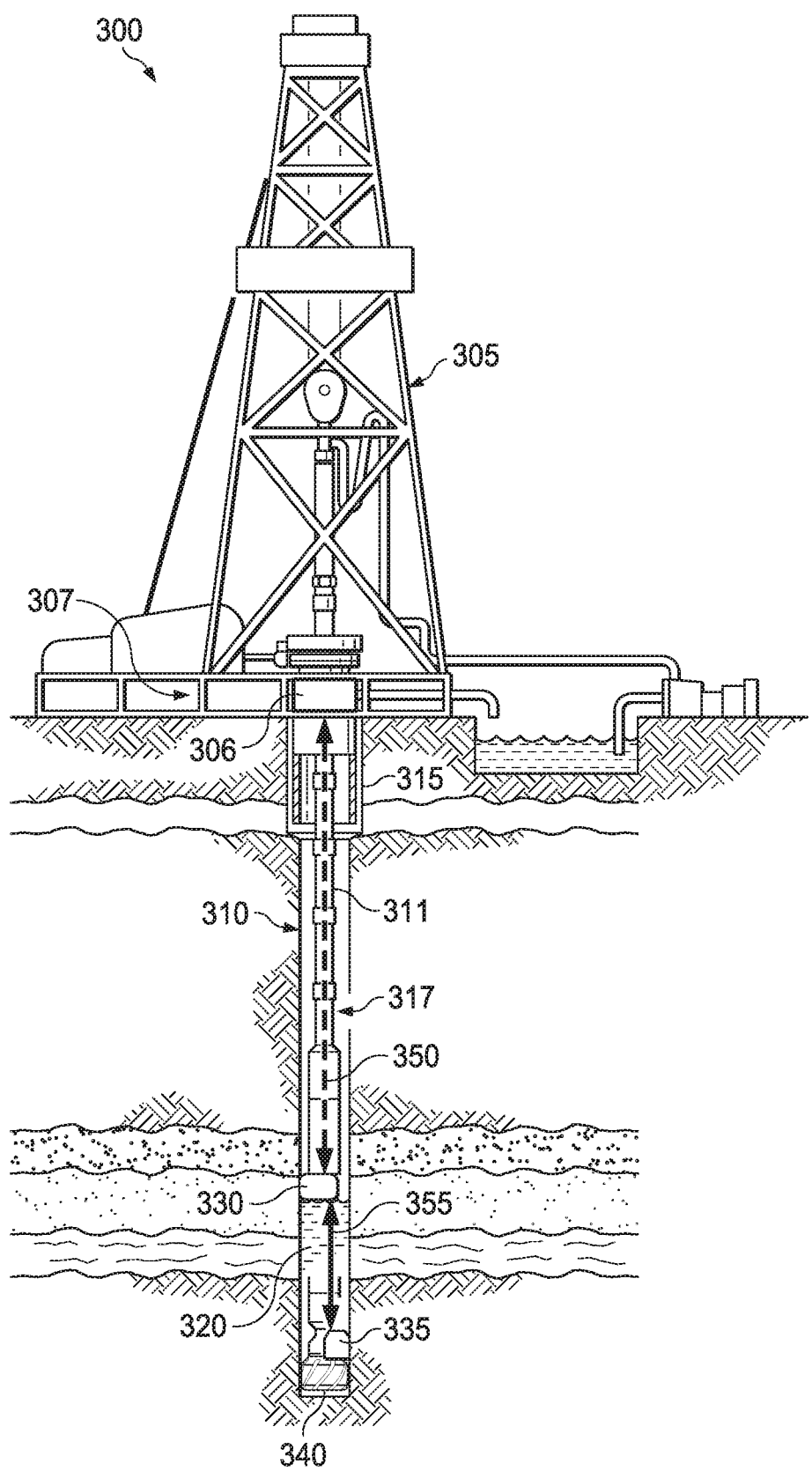
FIG. 3 illustrates a diagram of an example logging while drilling (LWD) or measure while drilling (MWD) well system that includes an acoustic communication system.

FIG. 3 illustrates a diagram of an example LWD/MWD well system 300 that includes an acoustic communication system. Well system operators gather information from locations within a wellbore of the well system 300 and send commands to tools located within the wellbore. This example includes well system surface equipment 305, a well system controller 307, a surface communicator 306 (the surface communicator 306 can also be considered or called a second transceiver), and a wellbore 310 extending into the ground from the surface equipment 305. Wellbore 310 has a cased section 315 and an uncased section 317. Within the wellbore 310 is drill string 311, a first wireless transceiver 330, an acoustic communicator 335, and a downhole tool, drill tool 340. The wellbore 310 is filled with a fluid 320 to at least a depth up to the first wireless transceiver 330. The well system 300 can include additional acoustic communicators 335.

Communication in the well system 300 can be initiated at either end of a communication link that includes the surface communicator 306, the first wireless transceiver 330, and the acoustic communicator 335. For this example, the communication transmission is initiated by the drill tool 340. Drill tool 340 is communicatively coupled with the acoustic communicator 335. Drill tool 340 and acoustic communicator 335 can be attached to each other, acoustic communicator 335 can be incorporated into drill tool 340, or they can be separate devices that are communicatively coupled. Drill tool 340 can generate or collect a set of data, observations, measurements, or other information which is then transmitted to the acoustic communicator 335.

Acoustic communicator 335 includes at least a transducer and a processor capable of transmitting and receiving an acoustic transmission signal via a fluid transmission medium. Other components can be included as well in acoustic communicator 335. Acoustic communicator 335 is oriented in such a way that the transducer head is pointed generally toward the intended transmission recipient. This orientation will help increase the directionality of the acoustic transmission signal 355, allowing the acoustic transmission signal 355 to travel a longer distance prior to it attenuating and losing signal integrity. The actual distance the acoustic transmission signal 355 can travel is dependent on the wellbore conditions and geometry, such as the type of fluid 320, the temperature of fluid 320, the pressure of fluid 320, and other factors. This orientation of acoustic communicator 335 can help reduce the number of repeaters within the wellbore.

Acoustic communicator 335, after receiving the drill tool 340 information, can determine an encoding scheme, a bit loading scheme, and a signal modulation scheme, of various available types. Acoustic transmission signal 355, including the encoded data, can be sent from acoustic communicator 335 through the fluid 320. The acoustic transmission signal 355 can be received by a first wireless transceiver 330, which is located uphole from the acoustic communicator 335. The first wireless transceiver 330 includes similar features of the acoustic communicator 335, but also includes an additional communication capability, such as an acoustic through tubing or cable line, type of communication method.

First wireless transceiver 330, via its processor, can decode and encode the data, modulate, or otherwise manipulate the encoded data and the acoustic transmission signal 355, prior to transmitting the encoded data, using transmission signal 350, through the first wireless medium. In this example, the first wireless medium is drill string 311 which is capable of carrying an acoustic transmission signal from the first wireless transceiver 330 to a surface communicator 306.

Surface communicator 306 can be located within the wellbore, located proximate to the well system surface equipment 305, or located proximate to the well system controller 307. The surface communicator 306, after receiving transmission signal 350 via drill string 311, can transmit the transmission signal to a well system controller 307 for further processing. As with the first wireless transceiver 330, and acoustic communicator 335, the surface communicator 306 is configured with sufficient circuitry and processor capability to transmit and receive a transmission signal, encode and decode the data, and modulate the transmission signal.

The transmission of the data, instructions, commands, or other information can be conducted in either direction within this communication system. Well system controller 307 can send a command to drill tool 340 via surface communicator 306, to a first wireless transceiver 330, to an acoustic communicator 335, and finally to the drill tool 340.

Figure 4:
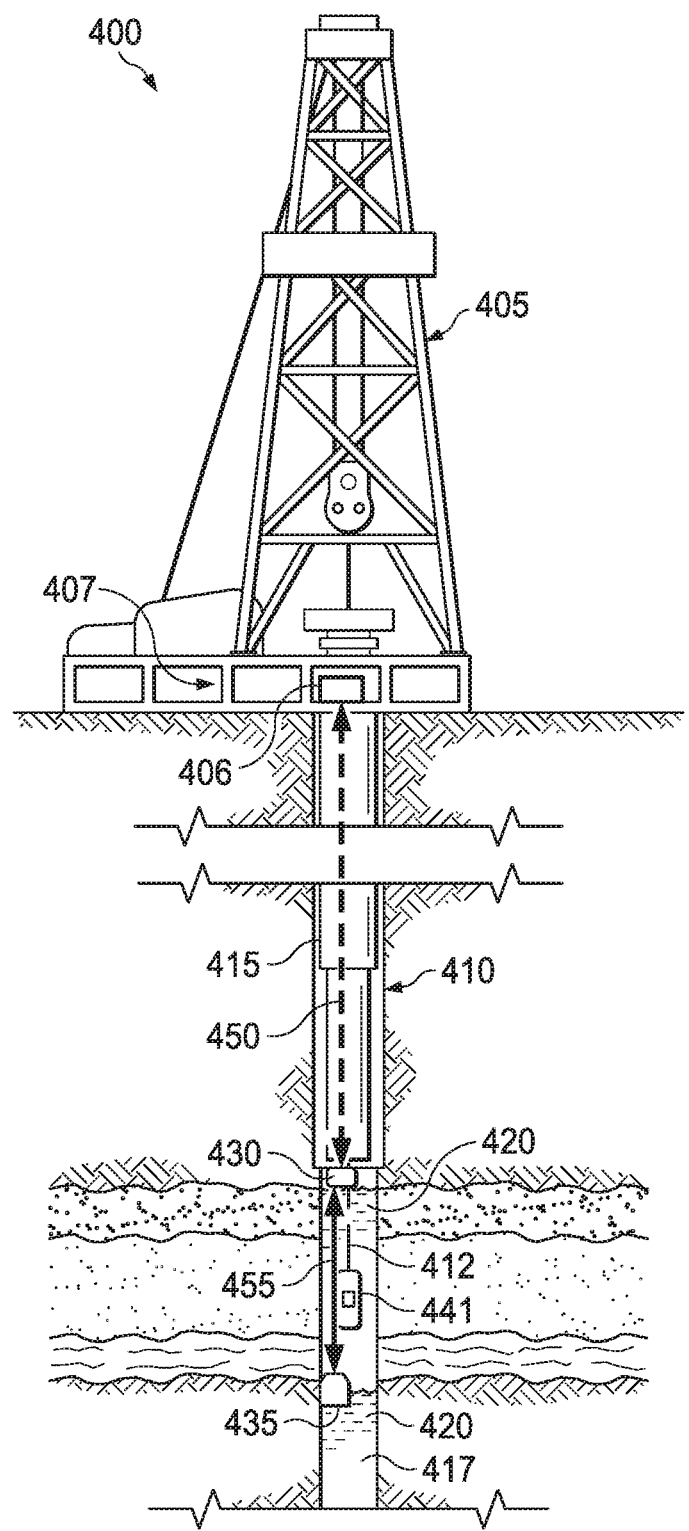
FIG. 4 illustrates a diagram of an example wireline well system that includes an acoustic communication system.

FIG. 4 illustrates a diagram of an example wireline well system 400 that includes an acoustic communication system. Well system 400 and its elements are similar to well system 300 and its elements. The elements of well system 400 will be identified here. The functionality of the communication system, as it is similar to well system 300, will not be repeated with respect to the description of FIG. 4. This example includes well system surface equipment 405, a well system controller 407, a surface communicator 406 (the surface communicator 406 can also be considered or called a second transceiver), and a wellbore 410 extending into the ground from the surface equipment 405. Wellbore 410 can have multiple cased sections 415 and an uncased section 417. Within the wellbore 410 is a wireline 412, a first wireless transceiver 430, an acoustic communicator 435, and a downhole tool 441. The wellbore 410 is filled with a fluid 420 to at least a depth up to the first wireless transceiver 430. The well system 400 can include multiple acoustic communicators 435.

Communication in the well system 400 can be initiated at either end of a communication link that includes the surface communicator 406, the first wireless transceiver 430, and the acoustic communicator 435. Downhole tool 441 is communicatively coupled with the acoustic communicator 435. Downhole tool 441 and acoustic communicator 435 can be, for example, attached to each other, acoustic communicator 435 can be incorporated into downhole tool 441, or they can be separate devices that are communicatively coupled.

First wireless transceiver 430 and acoustic communicator 435 are communicatively coupled and communicate through acoustic transmission signal 455. First wireless transceiver 430 and surface communicator 406, or other wireless transceivers, such as a second wireless transceiver located in the wellbore 410, are communicatively coupled and communicate through transmission signal 450, shown as a dashed line. Transmission signal 450 can be transmitted via a variety of transmission methods, for example, utilizing wireline 412, acoustic through fluid, acoustic through tubing, cable, fiber optic, and other wired methods.

Figure 5:
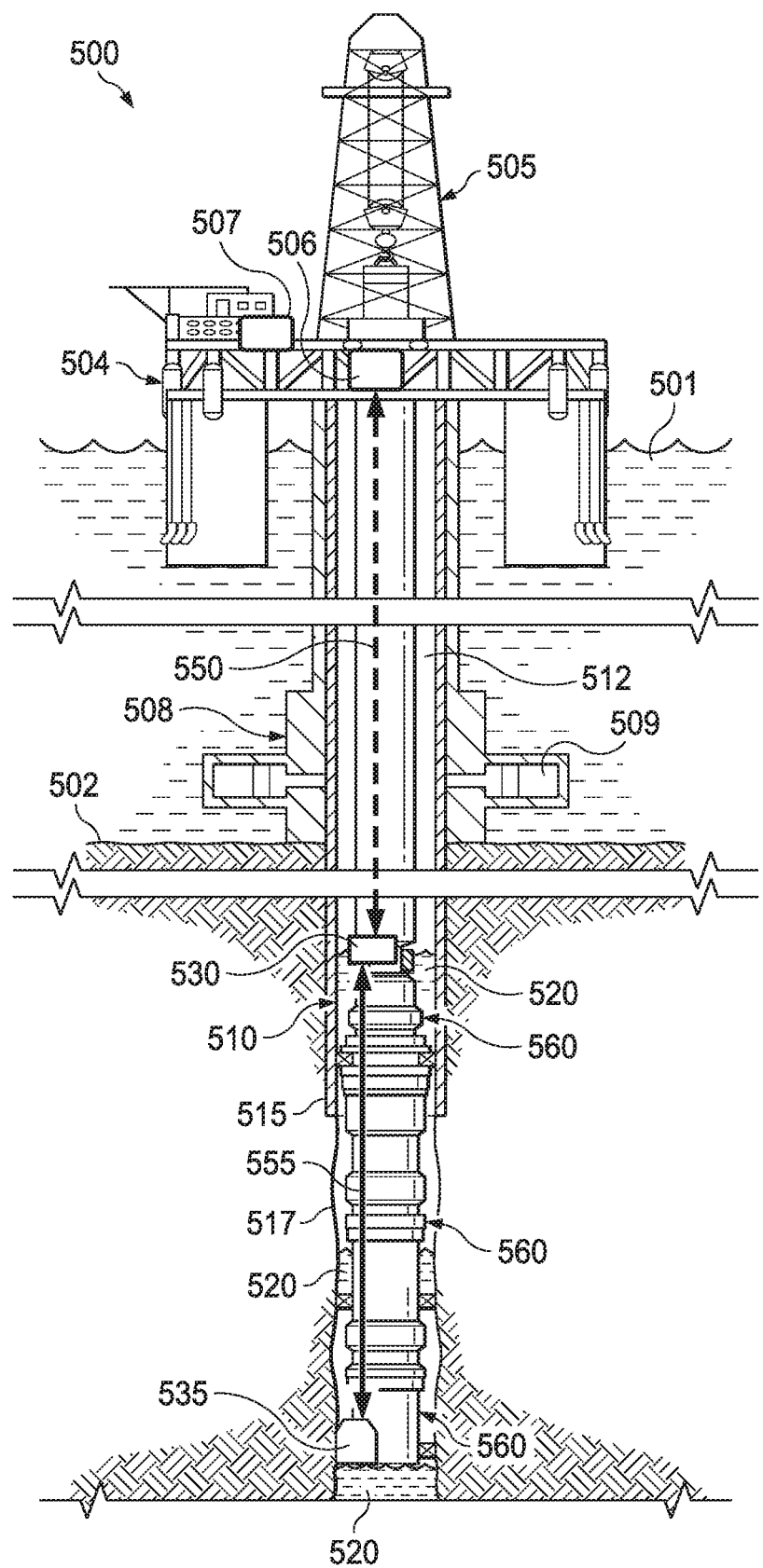
FIG. 5 illustrates a diagram of an example offshore platform well system with a casing based intelligent completion assembly that includes an acoustic communication system.

FIG. 5 illustrates a diagram of an example offshore platform well system 500 with a casing based intelligent completion assembly that includes an acoustic communication system as disclosed herein. Well system 500 includes some similar elements to well system 300 and 400. The functionality of the acoustic communication system of well system 500 is similar to that of well system 300 and 400. This illustrated example of FIG. 5 includes semi-submersible platform 504, located at sea level 501, well system platform equipment 505, a well system controller 507, a surface communicator 506 (the surface communicator 506 can also be considered or called a second transceiver), a subsea conduit 512 extending from platform 504 to wellbore 510, which begins near sea floor 502, a subsea wellhead installation 508, and blowout preventers 509.

Wellbore 510 may have one or more cased sections 515 and an uncased section 517. Within the wellbore 510 is a casing based intelligent completion assembly 560, which can include, without limitations, some or all of hangers, sensors, inflow control devices, packers, safety values (all not labeled), and other components. In addition, wellbore 510 can include a first wireless transceiver 530, and an acoustic communicator 535. The wellbore 510 is filled with a fluid 520 to at least a depth up to the first wireless transceiver 530. There can be multiple acoustic communicators 535 within the wellbore 510.

Communication in the well system 500 can be initiated at either end of a communication link that includes the surface communicator 506, the first wireless transceiver 530, and the acoustic communicator 535. The intelligent completion assembly 560 is communicatively coupled with the acoustic communicator 535. Intelligent completion assembly 560 and acoustic communicator 535 can be, for example, physically attached to each other, acoustic communicator 535 can be incorporated into intelligent completion assembly 560, or acoustic communicator 535 can be a separate device that is communicatively coupled to the intelligent completion assembly 560.

First wireless transceiver 530 and acoustic communicator 535 are communicatively coupled and communicate through acoustic transmission signal 555. First wireless transceiver 530 and surface communicator 506, or other wireless transceivers, such as a second wireless transceiver located in the wellbore 510 or subsea conduit 512, are communicatively coupled and communicate through transmission signal 550, shown as a dashed line. Transmission signal 550 can be carried via a variety of transmission methods, for example, acoustic through fluid, acoustic through tubing, cable, fiber optic, and other wired methods.

Figure 6:
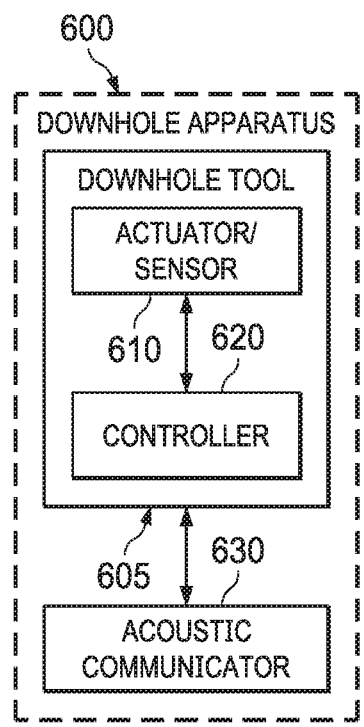
FIG. 6 illustrates a block diagram of an example of a downhole apparatus constructed according to the principles of the disclosure.

FIG. 6 illustrates a block diagram of an example apparatus 600 that can be located within a wellbore environment to perform an action for a well system. Apparatus 600 includes an actuator or sensor 610 capable of collecting and generating data in a downhole environment, a controller 620 (collectively comprising a downhole tool 605), and an acoustic communicator 630. The controller 620 includes the necessary interfaces and logic (e.g., software, hardware, or a combination thereof) to direct the operation of the downhole tool 605 including the actuator or sensor 610. The controller 620 is configured to communicate with the acoustic communicator 630 to receive operating instructions and transmit operating data. Acoustic communicator 630 is communicatively coupled to downhole tool 605. The acoustic communicator 630 can be a physical component of the downhole apparatus 600 or the acoustic communicator 630 can be a separate component where the downhole apparatus 600 is a collection of components. The dashed line designating the downhole apparatus 600 symbolizes either a physical or logical grouping of the specified components.

FIG. 7 illustrates a block diagram of an example well communication system 700 that can be utilized within a wellbore operation, as described in FIGS. 1 and 2 and further described in FIGS. 3-5. Communication system 700 includes a downhole tool 770, an acoustic communicator 772, a first wireless transceiver 774, and a second transceiver 776 that can utilize a wireless or wired medium for further communications.

Downhole tool 770 is communicatively coupled with acoustic communicator 772 via a transmission signal 760. The information and commands that are communicated across transmission signal 760 are represented by data block 780. Acoustic communicator 772 can have the capability to encode the information into an encoded data packet using an encoding and bit loading scheme. Acoustic communicator 772 then can create a modulated acoustic transmission signal 763, which comprises encoded data 781, which is then transmitted through a fluid medium. The transmission signal 763 is dotted to represent an acoustic transmission that can lack directionality and that the transmission signal 763 can spread through the fluid medium. The transmission signal 763 is received by a first wireless transceiver 774. The first wireless transceiver 774, can decode and re-encode the encoded data 781, for example, if data from a second acoustic communicator needs to be combined with the current transmission signal. The packet of encoded data 781 can be passed through as encoded data 782. The first wireless transceiver 774 can modulate the transmission signal 765 and transmit the transmission signal 765 through a first non-fluid medium, such as tubing. The transmission signal 765 can be an acoustic signal. A second transceiver 776 can receive the transmission signal 765 and the included encoded data 782. This example shows a transmission initiated from a downhole tool 770. As described above, the communication system 700 is operable in a bi-directional scheme so that a transmission signal can be initiated at a second transceiver 776 and sent to a downhole tool 770, as illustrated by the double headed arrows for the transmission signals 760, 763, and 765.

FIG. 8 illustrates a block diagram of an example well communication system 800 expanding on FIG. 7's communication system 700. In this example, well communication system 800 includes additional downhole tools and additional transceivers. These additional transceivers can operate as repeaters should the wellbore conditions indicate additional repeaters would be beneficial. In addition, this example shows the addition of a well system controller to demonstrate an end to end communication system. This example shows that varying combinations of downhole tools, acoustic communicators, and transceivers are possible and recognized by this disclosure.

Communication system 800 includes of a first downhole tool 810, a second downhole tool 812, a first acoustic communicator 820, optional additional downhole tools 815, additional acoustic communicators 825, a first wireless transceiver 830, optional additional transceivers 835, a surface communicator 840, and a well system controller 850.

The first downhole tool 810, communicatively coupled to the first acoustic communicator 820, can collect and generate data 880 and proceed to send the data 880 to the first acoustic communicator 820 via a transmission signal 890. Similarly, a second downhole tool, downhole tool 812, of which there can be zero or more such downhole tools, and also communicatively coupled with the first acoustic communicator 820, can collect and generate data 881 and proceed to send the data 881 to the first acoustic communicator 820 via a transmission signal 891. Data 880 and 881 can include identification information necessary to identify the downhole tool associated with the data packet.

The first acoustic communicator 820 can encode the data and create a modulated signal to send the encoded data 882 via an acoustic transmission signal 892 through a fluid medium. Such data encoding can be by various available methods and use different bit loading schemes. The modulation of the transmission signal 892 can be by various available means. The transmission signal 892 is dotted to represent that the directionality of the transmission signal 892 may not be precise in a fluid.

Similarly, there can exist one or more additional downhole tools, represented by downhole tools 815 which are communicatively coupled to one or more additional acoustic communicators 825 via one or more transmission signals 897. Additional downhole tools 815 can gather and generate sets of data 887 and similarly transmit the sets of data 887 to the additional acoustic communicators 825. Additional acoustic communicators 825 can encode the data 887 and create one or more modulated transmission signals to send the encoded data 888 via an acoustic transmission signal 898 through a fluid medium. The additional acoustic communicators 825 can be configured to encode, load, and modulate the data as described above with respect to the first acoustic communicator 820. The transmission signal 898 is dotted to represent that the directionality of the transmission signal may not be precise in a fluid.

A first wireless transceiver 830 receives the transmission signal 892 and the transmission signal 898, if present. The first wireless transceiver 830 can optionally decode the received data signals and re-encode them by combining the encoded data 882 and 888, if present. In another example, the first wireless transceiver can pass through the received encoded data 882 and encoded data 888 unchanged as separate data packets, if such data packets are present. The first wireless transceiver 830 proceeds to send a new transmission signal 893, comprising of encoded data 883, via a first non-fluid medium, for example, tubing. Depending on the well system conditions and operations, additional transceivers may be located within the wellbore. The two illustrated transmission paths for transmission signal 893 show options of how the communication system may be implemented. In one example, should the next link in the communication system be a surface communicator 840, then that element will receive the transmission signal 893.

In another example, if one or more additional transceivers are implemented, then the additional transceivers 835 will receive the transmission signal 893 prior to the transmission signal 893 being relayed to the surface communicator 840. There can be one or more additional transceivers, acting as a repeater to transmit the transmission signal 895, with encoded data 885, to the surface communicator 840. The additional transceivers 835 and the surface communicator 840 can utilize a wired or wireless transmission medium, for example, tubing, electric wire, fiber optic cable, or other mediums.

The surface communicator 840 can receive a transmission signal 893 or 895, according to the various examples disclosed herein. The surface communicator 840 can optionally decode the data received. The surface communicator 840 can then send a transmission signal 894 comprising either the encoded or decoded data 884 to a well system controller 850 for further processing.

A transmission path or paths from downhole tools 810, 812, and 815 to the well system controller 850 has been described. The communication system 800 is a bi-directional system so that the well system controller 850 can send commands, instructions, or other information to downhole tools 810, 812, and 815. The data being sent from either the downhole tools 810, 812, and 815 or the data being sent from the well system controller 850 can include identifying information so that the data packets can be identified and associated with the respective downhole tool.

FIG. 9 illustrates a flow diagram of an example of a method 900 to allow a downhole tool and a well system controller to communicate encoded data via an acoustic communicator and at least one wireless transceiver.

The method 900 begins at a step 901. In a step 905 a downhole tool and an acoustic communicator are communicatively coupled. In a step 907, the acoustic communicator can be oriented so that the acoustic signal is transmitted proximately directional to the intended receiver, such approximate orientation can be limited by the wellbore geometry and conditions. In a decision step 915, the method 900 determines where the data and transmission will initiate from and to which target equipment is to receive the transmitted data. Decision step 915 is intended to mimic the bi-directional capability of the communication system in that transmission signals can be sent downhole or uphole using the same communication system.

If decision step 915 resultant is to send data uphole to a well system controller, the method 900 proceeds to a step 920. In the step 920, data is gathered and generated, such as a status determined or a command acknowledged, from the downhole tool and transmitted to an acoustic communicator. The method 900 can optionally proceed to a step 923 where the acoustic communicator can determine a bit loading, encoding scheme, and a modulation scheme.

After step 920, or optionally step 923, the method 900 proceeds to a step 925 where the acoustic communicator can transmit the encoded data via an acoustic transmission signal through a fluid medium. In a step 930, a first wireless transceiver can receive the transmission signal. In a step 935, the first wireless transceiver can transmit the previously received data. The first wireless transceiver can utilize a non-fluid medium for the transmission signal. The method 900 can optionally proceed to a step 937 where one or more additional transceivers can continue to receive and transmit the encoded data transmission signal, effectively acting like repeaters within the communication system.

After step 935, or optionally step 937, the method 900 proceeds to a step 940 where the encoded data transmission signal is received by a surface communicator. In a step 945, the surface communicator can transmit the encoded or decoded data to a well system controller for further processing. The method 900 ends at a step 990.

Alternatively, if decision step 915 resultant is to send data downhole to a downhole tool, the method 900 proceeds to a step 950. In the step 950, data is gathered and generated, such as a command sent, from the well system controller and transmitted to a surface communicator. The method 900 can optionally proceed to a step 953 where the surface communicator can determine a bit loading allocation, encoding scheme, and a modulation scheme.

After step 950, or optionally step 953, the method 900 proceeds to a step 955 where the surface communicator can transmit the encoded data via a transmission signal. The method 900 can optionally proceed to a step 957 where one or more additional transceivers can continue to receive and transmit the encoded data transmission signal, effectively acting like repeaters within the communication system. The transmission medium utilized between these communicators and transceivers can be of various types, including wired or wireless.

After step 955, or optionally step 957, the method 900 proceeds to a step 960 where the encoded data transmission is received by a first wireless transceiver where the transmission medium is a wireless type, for example, via acoustic tubing. In a step 965, the first wireless transceiver can transmit the encoded data via a fluid transmission medium. In a step 970, an acoustic communicator can receive the encoded data from the acoustic transmission signal sent through the fluid medium. In a step 975, the acoustic communicator can transmit the encoded or decoded data to a downhole tool for further processing. The method 900 ends at a step 990.

FIG. 10 illustrates a chart 1000 of an example graph demonstrating the effect of the ratio of a transducer piston head diameter to the wavelength of a transmission signal within a fluid medium that exists within a wellbore on signal directionality. The transducer produces the acoustic transmission signal in the fluid medium and the smaller the directionality of the transmission signal, less power is consumed to transmit the signal a certain distance. It is desirable to have a smaller directionality. X-axis 1010 shows the angle, in degrees, that a signal can spread. Y-axis 1020 shows a relative response, or signal strength at a specific distance from the transducer.

Plotted line 1030 shows the approximate spread of an acoustic signal when using a piston head that has a diameter one-tenth ($\frac{1}{10}$) of the wavelength of a transmitted signal through a specified fluid. Plotted line 1040 shows the approximate spread of an acoustic signal when using a piston head that has a diameter one-half ($\frac{1}{2}$) of the wavelength of a transmitted signal through the same specified fluid. Plotted line 1050 shows the approximate spread of an acoustic signal when using a piston head that has a diameter equal to that of the wavelength of a transmitted signal through the same specified fluid. The distance that an acoustic transmission signal can travel before needing a repeater is longer when the directionality spread angle of the transmission signal is smaller. In addition, the amount of energy or power to transmit a signal with a smaller angle of directionality spread is less than if the signal disperses across a larger angle of directionality spread.

Ideally, the diameter of the transducer piston head within an acoustic communicator or first wireless transceiver can be approximately half of the wavelength of a transmission signal through a specified fluid that exists in the wellbore. The well environment, conditions, and geometry may affect the size and type of transducer that can be used.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. It is noted that as used herein and in the appended claims, the singular forms "a", "an", and "the" include plural referents unless the context clearly dictates otherwise.

Those skilled in the art to which this application relates will appreciate that other and further additions, deletions, substitutions and modifications may be made to the described implementations. It is also to be understood that the terminology used herein is for the purpose of describing particular implementations only, and is not intended to be limiting, since the scope of the present disclosure will be limited only by the claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

A portion of the above-described apparatuses, systems (such as the various controllers described herein) or methods may be embodied in or performed by various processors, such as digital data processors or computers, wherein the processors are programmed or store executable programs or sequences of software instructions to perform one or more of the steps of the methods or functions of the apparatuses or systems. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain aspects disclosed herein may further relate to computer storage products with a non-transitory computer-readable medium that have program code thereon for performing various computer-implemented operations that embody at least part of the apparatuses, the systems or carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include machine code, such as produced by a compiler, and files containing higher level code that may be executed by the computer using an interpreter.

Aspects disclosed herein include:

A. A communication system for a well system environment having transmitters that communicate over different mediums, including an acoustic communicator, located within a wellbore, configured to wirelessly transmit acoustic transmission signals through a fluid located within the wellbore, wherein the acoustic transmission signals include encoded data, and a first wireless transceiver, located within the wellbore, configured to receive the acoustic transmission signals via the fluid and transmit the encoded data via a first non-fluid medium.

B. A method of wirelessly communicating encoded data in a well system environment, including wirelessly communicating acoustic transmission signals between an acoustic communicator and a first wireless transceiver, in a wellbore, through a fluid located within the wellbore, wherein the acoustic transmission signals include encoded data, and communicating the encoded data between the first wireless transceiver and a second transceiver via a first non-fluid medium.

C. An apparatus for use in a wellbore, comprising a device including of one or more of an actuator and a sensor, a controller configured to direct an operation of the device, and an acoustic communicator communicatively coupled to the controller and configured to wirelessly transmit acoustic transmission signals through a fluid located within the wellbore, wherein the acoustic transmission signals include encoded data corresponding to the operation of the device.

Each of aspects A, B, and C may have one or more of the following additional elements in combination:

Element 1: wherein the acoustic communicator is communicatively coupled to a downhole tool located in the wellbore. Element 2: wherein the downhole tool is a device where a movement of the device results in a change of a fluid flow within the wellbore. Element 3: wherein the acoustic communicator is further configured to receive encoded data wirelessly transmitted downhole through the fluid from the first wireless transceiver via acoustic transmission signals. Element 4: further comprising a surface communicator configured to transmit and receive the encoded data via the first non-fluid medium, and configured to transmit and receive data with a well system controller via another transmission medium. Element 5: further comprising a second wireless transceiver configured to receive the encoded data via the first non-fluid medium and transmit the encoded data via a second non-fluid medium. Element 6: wherein one of the first wireless transceiver and the second wireless transceiver is a distributed acoustic sensing (DAS) fiber optic device and the other one of the first wireless transceiver and the second wireless transceiver is a tubular acoustic sensing device. Element 7: further comprising a surface communicator configured to transmit and receive the encoded data via the second non-fluid medium, and configured to transmit and receive data with a well system controller via another transmission medium. Element 8: wherein one of the acoustic communicator and the first wireless transceiver is positioned within an interior diameter of a tubing located in the wellbore and the other one of the acoustic communicator and the first wireless transceiver is positioned on an exterior of the tubing. Element 9: wherein the acoustic communicator is one of a tonpilz transducer, hydrophone, accelerometer, strain sensor, and pressure transducer. Element 10: wherein the acoustic communicator is a tonpilz transducer having a piston head equal to or less than half a wavelength of the acoustic transmission signal transmitted through the fluid. Element 11: further comprising communicating the encoded data between the second transceiver and a surface communicator communicatively coupled to a well system controller. Element 12: wherein the encoded data is communicated between the second transceiver and the surface communicator via one of a non-fluid wireless medium and a wired medium. Element 13: wherein the second transceiver is a surface communicator. Element 14: wherein the acoustic communicator and the first wireless transceiver are located in a same fluid column of the wellbore. Element 15: wherein the acoustic communicator and the first wireless transceiver are located in different fluid columns of the wellbore. Element 16: wherein the encoded data is associated with a downhole tool communicatively coupled to the acoustic communicator. Element 17: further comprising utilizing a bit loading allocation for the encoded data, and modulating a carrier signal for the encoded data utilizing one or more of frequency shift keying, phase shift keying, frequency hopped spectrum, direct sequence spread spectrum, frequency and pulse-position, multiple frequency shift keying, and orthogonal frequency-division multiplexing. Element 18: further comprising orienting the acoustic communicator and first wireless transceiver to communicate the acoustic transmission signals between the acoustic communicator and the first wireless transceiver with an increased transmission directionality. Element 19: wherein at least a part of the wellbore is without tubing, electronic wiring, and fiber cabling.

What is claimed is:

1. A communication system for a well system environment having transmitters that communicate over different mediums, comprising:
    an acoustic communicator, located within an interior diameter of a tubing of a lower completion of a wellbore, configured to wirelessly communicate through a fluid by generating acoustic waves in the fluid;
    a first transceiver, located within an interior diameter of a tubing of an upper completion of the wellbore, configured to wirelessly communicate with the acoustic communicator via the fluid, wherein the acoustic communicator, the first transceiver, and the fluid are located within a same fluid column corresponding to the interior diameter of the tubing of the lower completion and the interior diameter of the tubing of the upper completion; and
    a second transceiver, located external of the interior diameter of the tubing of the upper completion and configured to communicate with the first transceiver via a first non-fluid medium, wherein the second transceiver is located within the wellbore and the communication system further comprises a surface communicator located at the wellbore and configured to communicate with the second transceiver via a second non-fluid medium.

2. The communication system as recited in claim 1 wherein positions of the acoustic communicator, the first transceiver, and the second transceiver are fixed.

3. The communication system as recited in claim 1 wherein the acoustic communicator is communicatively coupled to a device located in the wellbore and a movement of the device results in a change of a fluid flow within the wellbore.

4. The communication system as recited in claim 1, wherein the acoustic communicator and the surface communicator are configured to communicate encoded data via the first transceiver and the second transceiver.

5. The communication system as recited in claim 1, wherein the second non-fluid medium is a fiber optic cable.

6. The communication system as recited in claim 1, wherein the second non-fluid medium is an electronic cable.

7. The communication system as recited in claim 1, wherein the second transceiver is a distributed acoustic sensing (DAS) fiber optic device.

8. The communication system as recited in claim 1, wherein the first non-fluid medium and the second non-fluid medium are both electronic cable.

9. The communication system as recited in claim 1, wherein the first non-fluid medium is an electronic cable and the second non-fluid medium is a fiber optic cable.

10. The communication system as recited in claim 1 wherein the acoustic communicator is a ring transducer.

11. The communication system as recited in claim 1 wherein the acoustic communicator is a tonpilz transducer having a piston head equal to or less than half a wavelength of the acoustic transmission signals transmitted through the fluid.

12. A method of communicating encoded data in a well system environment, comprising:
    wirelessly communicating, in a fluid column of a wellbore, acoustic transmission signals between an acoustic communicator and a first transceiver by the acoustic communicator or the first transceiver generating acoustic waves in a fluid within the fluid column, wherein the acoustic transmission signals include encoded data;
    communicating the encoded data between the first transceiver and a second transceiver via a first non-fluid medium, wherein the first transceiver and the second transceiver are located in the wellbore; and
    communicating the encoded data between the second transceiver and a surface communicator via a second non-fluid medium located external to an interior diameter of a tubing located within the wellbore, wherein the second transceiver is located within the wellbore and the surface communicator is located at the wellbore; and
    communicating the encoded data between the surface communicator and a well system controller.

13. The method as recited in claim 12, wherein at least a part of the wellbore is without tubing, electronic wiring, and fiber cabling.

14. The method as recited in claim 12 wherein the encoded data is communicated between the second transceiver and the surface communicator via an electronic cable.

15. The method as recited in claim 12 wherein the second non-fluid medium is a fiber optic cable.

16. The method as recited in claim 12 wherein the acoustic communicator is integrated with a lower completion and the first transceiver is integrated with an upper completion.

17. The method as recited in claim 12 wherein the first non-fluid medium and the second non-fluid medium are both electronic cables.

18. The method as recited in claim 12, wherein the encoded data is associated with a downhole tool communicatively coupled to the acoustic communicator.

19. The method as recited in claim 12, further comprising:
    utilizing a bit loading allocation for the encoded data; and
    modulating a carrier signal for the encoded data utilizing one or more of frequency shift keying, phase shift keying, frequency hopped spectrum, direct sequence spread spectrum, frequency and pulse-position, multiple frequency shift keying, and orthogonal frequency-division multiplexing.

20. The method as recited in claim 12, wherein the first transceiver includes a hydrophone and the method further includes increasing transmission directionality between the acoustic communicator and the first transceiver by orienting the acoustic communicator with the hydrophone.

* * * * *